April 6, 1948. J. A. NEWTON ET AL 2,439,315
SEAL CONSTRUCTION
Filed Nov. 29, 1943

Inventors
John A. Newton.
Norman. Hoertz
by Charles W. Hills Attys

Patented Apr. 6, 1948

2,439,315

UNITED STATES PATENT OFFICE 2,439,315

SEAL CONSTRUCTION

John A. Newton and Norman Hoertz, Cleveland, Ohio, assignors to Thompson Products, Inc., Cleveland, Ohio, a corporation of Ohio Application November 29, 1943, Serial No. 512,164

3 Claims. (Cl. 103—103)

This invention relates to seals of the type having relatively moving parts with faces in sliding sealing engagement.

Specifically the invention relates to shaft seals for pumps such as the water pump of an internal combustion engine.

The invention will hereinafter be specifically described as embodied in a water pump for an internal combustion engine, but it should be understood that the invention is not limited to such usage, being generally applicable to seals.

According to the invention, a pump housing rotatably carries the pump shaft in a bearing and has a smooth annular face receiving a sealing washer in sliding sealing relation thereagainst. The sealing washer freely embraces the shaft and is directly bonded to a deformable resilient bushing preferably composed of rubber, synthetic rubber such as neoprene, or other suitable resilient plastic material. This bushing, in turn, is bonded to either the shaft or a pump impeller driven by the shaft. A spring acts on the shaft through the bearing carrying the shaft to urge the sealing washer against the annular face of the housing. The sealing washer can be composed of compressed graphitic carbon, hard rubber, or the like known seal material. Suitable materials are known to the trade as "Morganite" and "Graphitar."

The resilient bushing drives the sealing washer to rotate against the annular face of the housing and at the same time, since it is bonded to the shaft or impeller and to the sealing washer, it prevents leakage through the hole in the sealing washer and avoids the necessity for a snug sealing fit between the shaft and washer. Since the washer is loose on the shaft, wobbling movements of the shaft or impeller do not move the washer and are absorbed by the resilient bushing so that the sealing washer will always be maintained in full sealing engagement with the annular surface of the housing. In addition, cocking of the shaft or impeller will not cock the sealing washer since the rubber bushing will deform to maintain the sealing washer in proper sealing engagement.

It is, then, an object of the invention to provide a seal of the sliding face-to-face type having a deformable bushing member driving a sealing washer and sealingly engaging both the washer and a driving element to prevent leakage through the washer.

A still further object of the invention is to eliminate the use of dowel pins and other driving mechanisms for sealing washers.

A still further object of the invention is to provide a shaft seal wherein a sealing washer is driven through shear loads applied on a rubber-like bushing.

A still further object of the invention is to positively drive a sealing washer from a shaft or shaft-rotated element without the use of driving pins, housing members or the like.

A still further object of the invention is to provide a shaft seal construction including a sealing washer loosely embracing a shaft and a rubber-like bushing bonded to both the sealing washer and the shaft or a shaft-driven part for driving the sealing washer while at the same time sealing against leakage between the shaft and washer.

Other and further objects of the invention will be apparent to those skilled in the art from the following detailed description of the annexed sheet of drawings which, by way of preferred example only, illustrate one embodiment of the invention.

Figure 1:
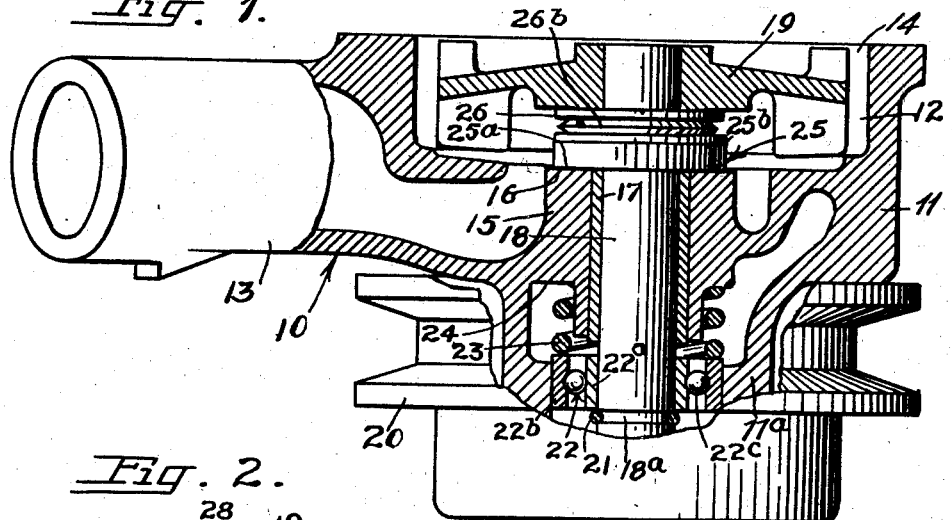
Figure 1 is a central cross-sectional view, with parts in elevation, of a water pump for an internal combustion engine equipped with a seal according to this invention.

In Figure 1, the reference numeral 10 indicates generally a water pump for an internal combustion engine. The pump 10 includes a casing 11 for mounting on an internal combustion engine. The casing 11 defines a pumping chamber 12 having an inlet 13 and an open end face 14 providing an outlet. A hub 15 is provided in the housing 11 and has a smooth annular end sealing face 16. A liner or bushing 17 is seated in the hub 15 and receives a pump shaft 18 therethrough. The shaft 18 projects into the pumping chamber 12 and an impeller 19 is secured on the end of the shaft in the pumping chamber 12. The other end of the shaft projects beyond the housing 11 and has a pulley 20 secured thereon. The pulley 20 is adapted to be driven by the fan belt of the internal combusion engine (not shown). The pulley 20 is hollow as indicated in Figure 1 and receives a portion 11a of the pump casing 11.

The shaft 18 has a groove 18a therein receiving a snap ring 21. A ball bearing 22 has an inner race 22a pressed on the shaft 18 and bottomed on the snap ring 21. The bearing 22 also has an outer race 22b slidably seated in the portion 11a of the casing 11.

A coil spring 23 is compressed between a shoulder 24 surrounding the hub 15 of the pump casing 11 and the outer race 22b of the bearing 22. Balls 22c or other anti-friction elements are disposed between the races 22a and 22b and ride in grooves in these races so that the bearing 22 acts as a thrust bearing and the spring 23 will urge the shaft 18 away from the housing 11 for a purpose to be more fully hereinafter described.

Figure 2:
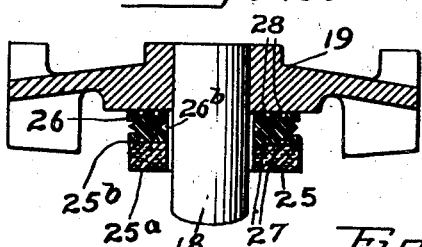
Figure 2 is a cross-sectional view, with parts in elevation, of a pump shaft and impeller equipped with one form of seal according to this invention.

In accordance with this invention, and as shown in Figures 1 and 2, a sealing washer 25 loosely embraces the shaft 18 and has one face 25a thereof sealingly engaging the surface 16 of the pump casing to ride on this surface. The sealing washer 25 is preferably composed of a compressed graphitic carbon material and is quite hard.

A resilient bushing 26 preferably composed of synthetic rubber such as neoprene or the like, is disposed freely around the shaft 18 between the sealing washer 25 and the impeller 19. The bushing 26 has one face thereof sealingly united to a face 25b of the sealing washer 25 through bonds 27 while the other face thereof is sealingly united to the impeller 19 through bonds 28.

Figure 5:
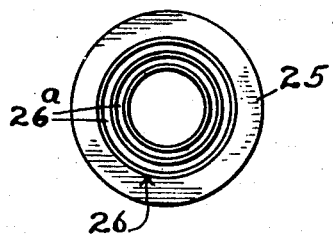
Figure 5 is an end elevational view of a seal washer and rubber bushing according to this invention.

In the form shown in Figures 1, 2 and 5, the bushing 26 has grooved end faces providing annular recesses 26a for receiving cement or other bonding material to insure good bonds 27 and 28 with the sealing washer and the impeller. If desired, the bushing 26 can be vulcanized to the impeller and sealing washer.

The bushing 26 also has a single bellows fold 26b between the end faces thereof for the purpose of rendering the rubber material more deformable to accommodate tilting and cocking movements of the shaft and impeller.

The bonds 27 and 28 integrally join the sealing washer 25 through the bushing 26 with the impeller so as to drive the sealing washer from the impeller by subjecting the bushing to shear loads.

The spring 23 acting on the shaft 18 through the thrust bearing 22 pulls the impeller 19 toward the bearing face 16 of the housing but, since the sealing washer 25 and bushing 26 are interposed between the impeller and this face 16 of the housing, the sealing washer 25 is constantly urged into sealing relation with the face 16 and the rubber bushing resiliently backs up the sealing washer. In the event that the impeller and/or shaft should wobble or be cocked during operation, the tilting movements are absorbed in the bushing 26 and, since the sealing washer 25 is spaced around the shaft, it will not be cocked off of the face 16 of the housing. Thus the pumping chamber 12 of the pump is sealed against leakage along the shaft 18 through the hub 15.

Driving members such as have heretofore been necessary between the sealing washer and the impeller or shaft are now eliminated and the rubber bushing serves the multi-purpose of driving the sealing washer, of backing up the sealing washer to prevent cocking or tilting of the same, and of sealing against leakage along the shaft through the hole in the sealing washer.

Figure 3:
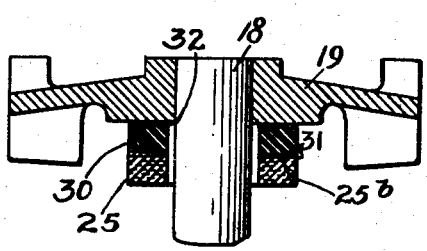
Figure 3 is a view similar to Figure 2 illustrating another form of seal according to this invention.

In the embodiment shown in Figure 3, a plain resilient bushing 30 is used in place of the bellows-type bushing 26 of Figures 1 and 2 and is disposed freely around the shaft 18. This bushing 30 has one face thereof connected through a bond 31 with the face 25b of the sealing washer, and has the other face thereof connected through a bond 32 with the impeller 19. The assembly of Figure 3 operates in the same manner as described in connection with Figures 1 and 2.

In the constructions of Figures 1 to 3, the resilient bushings and the sealing washers are both free on their shafts and the washers are driven through the bushings from the impellers which are pressed on the shafts. Leakage along the shaft is prevented by the press fit between the shaft and impeller and by the bond between the impeller and bushing. The free or loose fit of the bushing on the shaft permits more deforming of the bushing in the event of tilting or wobbling of the impeller because the bushing will not bend on the shaft.

Figure 4:
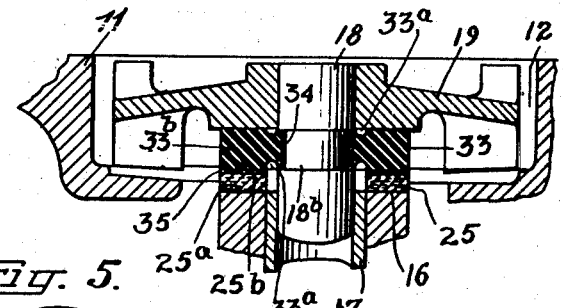
Figure 4 is a fragmentary view similar to Figure 1 illustrating still another form of seal according to this invention.

In the modification of Figure 4, the shaft 18 is provided with a groove 18b immediately adjacent the impeller 19 and a rubber bushing 33, interposed between the sealing washer 25 and the impeller 19, is seated in this groove 18b and sealingly united to the shaft through a bond 34 between the hole-defining surface of the bushing and the groove wall 18b of the shaft. The bushing 33 preferably has grooves 33a in the end faces thereof adjacent the shaft 18 so that the bonded portion of the bushing lying in the groove 18b can be readily tilted or deformed relative to the outer peripheral portion of the bushing. An end face 33b of the bushing 33 is sealingly united through a bond 35 with the face 25b of the sealing washer. In this modification, therefore, the sealing washer 25 is driven from the shaft 18 through the bushing 33. Tilting or wobbling movements of the shaft and impeller are absorbed in the bushing and leakage through the hole in the sealing washer is prevented by the bonds 34 and 35.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a seal construction for a shaft and impeller assembly, a sealing washer loosely embracing said shaft, a deformable rubber-like bushing surrounding said shaft between said sealing washer and said impeller, said bushing having grooved end faces, and bonding material in said grooved end faces sealingly uniting said washer with said bushing and said bushing with said impeller.

2. In a pump assembly including a shaft, an impeller on said shaft, and said shaft having an annular groove therearound adjacent said impeller, the improvements of a sealing washer loosely embracing said shaft, a rubber bushing disposed around said shaft and seated in said groove, a bond sealingly uniting the grooved portion of the shaft with said bushing, and a second bond sealingly uniting the sealing washer and the bushing, said bushing having grooved end faces surrounding the portion thereof seated in said groove of the shaft accommodating relative deformation of the inner and outer peripheral portions of the bushing.

3. In a pump, a housing having a bearing hub with a planar end face, a shaft projecting through said end face of said hub, an impeller on said shaft having a planar end face disposed in opposed relationship to said bearing hub end face, a spring acting on said shaft urging said impeller end face toward said bearing hub end face, a sealing washer riding on said bearing hub end face and loosely embracing said shaft in freely spaced relation thereto, an annular bushing disposed around said shaft between said sealing washer and said impeller end face, said bushing having a solid resiliently deformable body substantially coextensive with said washer and providing an end face completely backing up the adjacent face of the sealing washer, a first bond sealingly uniting the abutting faces of said sealing washer and said bushing, and a second bond securing said bushing for rotation with said shaft and impeller, whereby said sealing washer is driven with said shaft and impeller through said bushing and said bushing accommodates tilting movements of the shaft and impeller through interparticle flow of the bushing material without unseating the sealing washer from said end face of said bearing hub.

JOHN A. NEWTON.
NORMAN HOERTZ.

REFERENCES CITED

The following references are of record in the file of this patent:

UNITED STATES PATENTS

| Number | Name | Date |
|---|---|---|
| 1,897,280 | Schwitzer et al. | Feb. 14, 1933 |
| 1,978,689 | Peters | Oct. 30, 1934 |
| 2,027,505 | Winkler | Jan. 14, 1936 |
| 2,068,536 | Davies | Jan. 19, 1937 |
| 2,106,884 | Bliss | Feb. 1, 1938 |
| 2,243,227 | Stratton | May 27, 1941 |
| 2,251,219 | Brummer | July 29, 1941 |
| 2,311,287 | Boden | Feb. 16, 1943 |
| 2,341,900 | Boden | Feb. 15, 1944 |
| 2,342,955 | Meyer | Feb. 29, 1944 |

FOREIGN PATENTS

| Number | Country | Date |
|---|---|---|
| 522,720 | Great Britain | 1940 |